Sheet 2, 3 Sheets.
W. Dawes.
Steam Engine Valve Gear.
Nº 96,400. Patented Nov. 2, 1869.
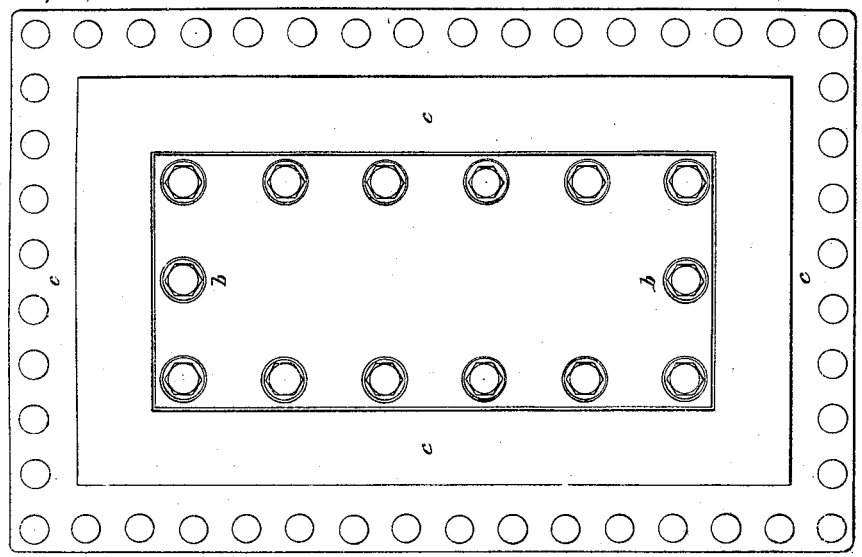
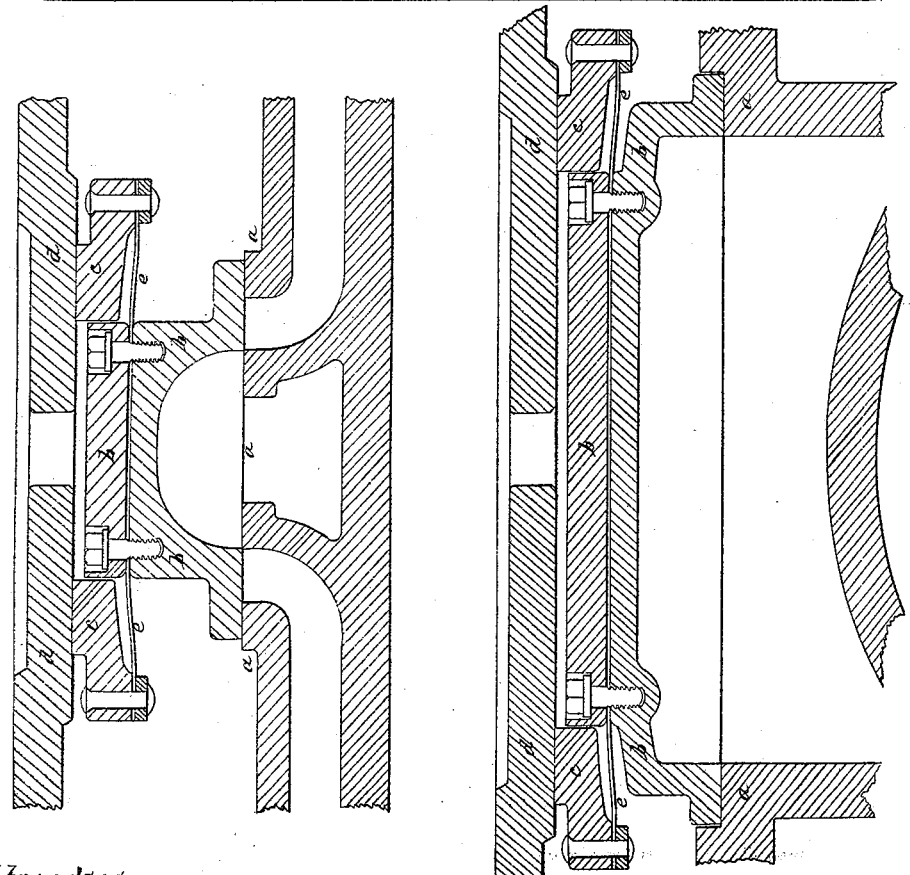
Witnesses
Fredric C. Moore
Fredric W. Fenton
Inventor
William Dawes

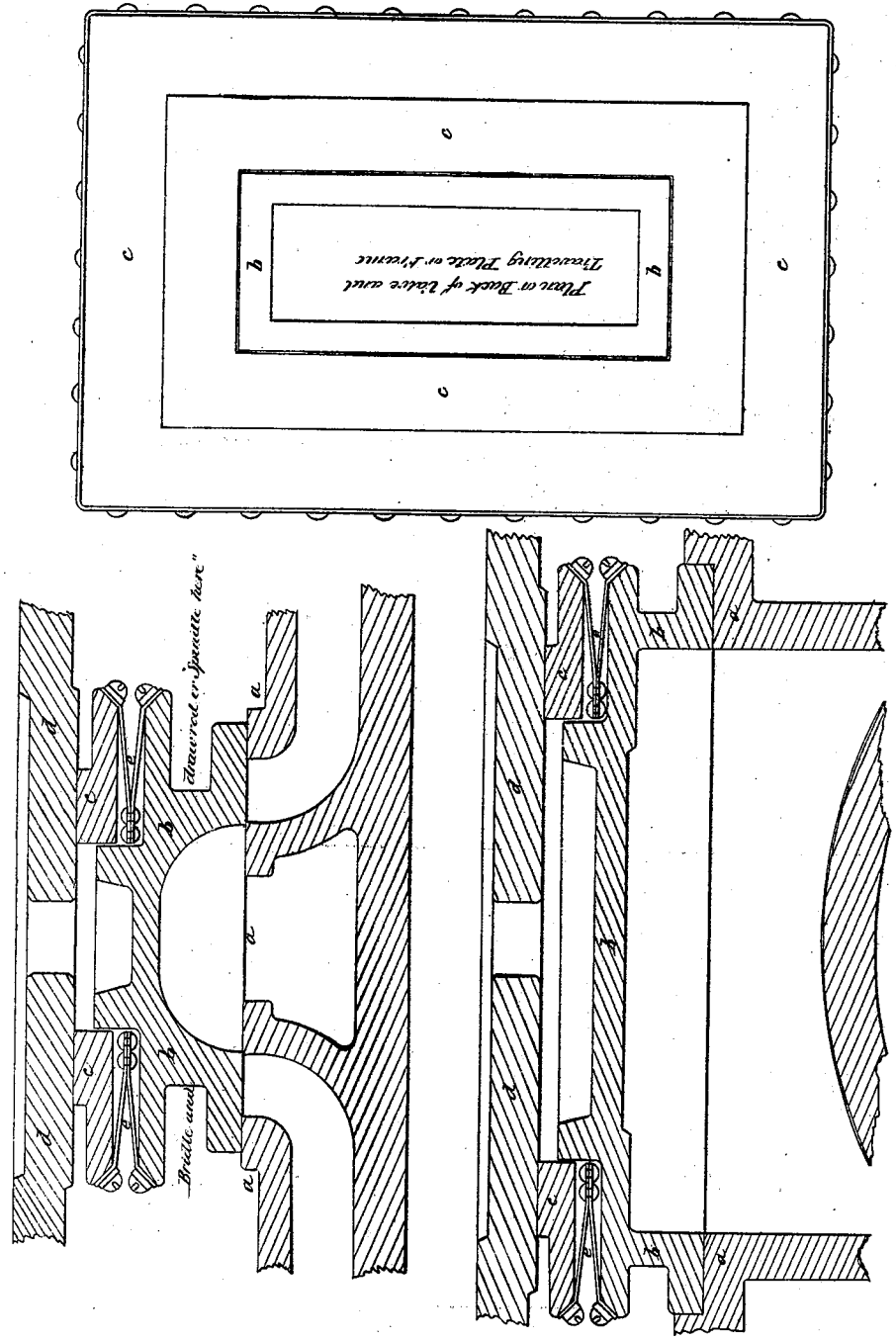

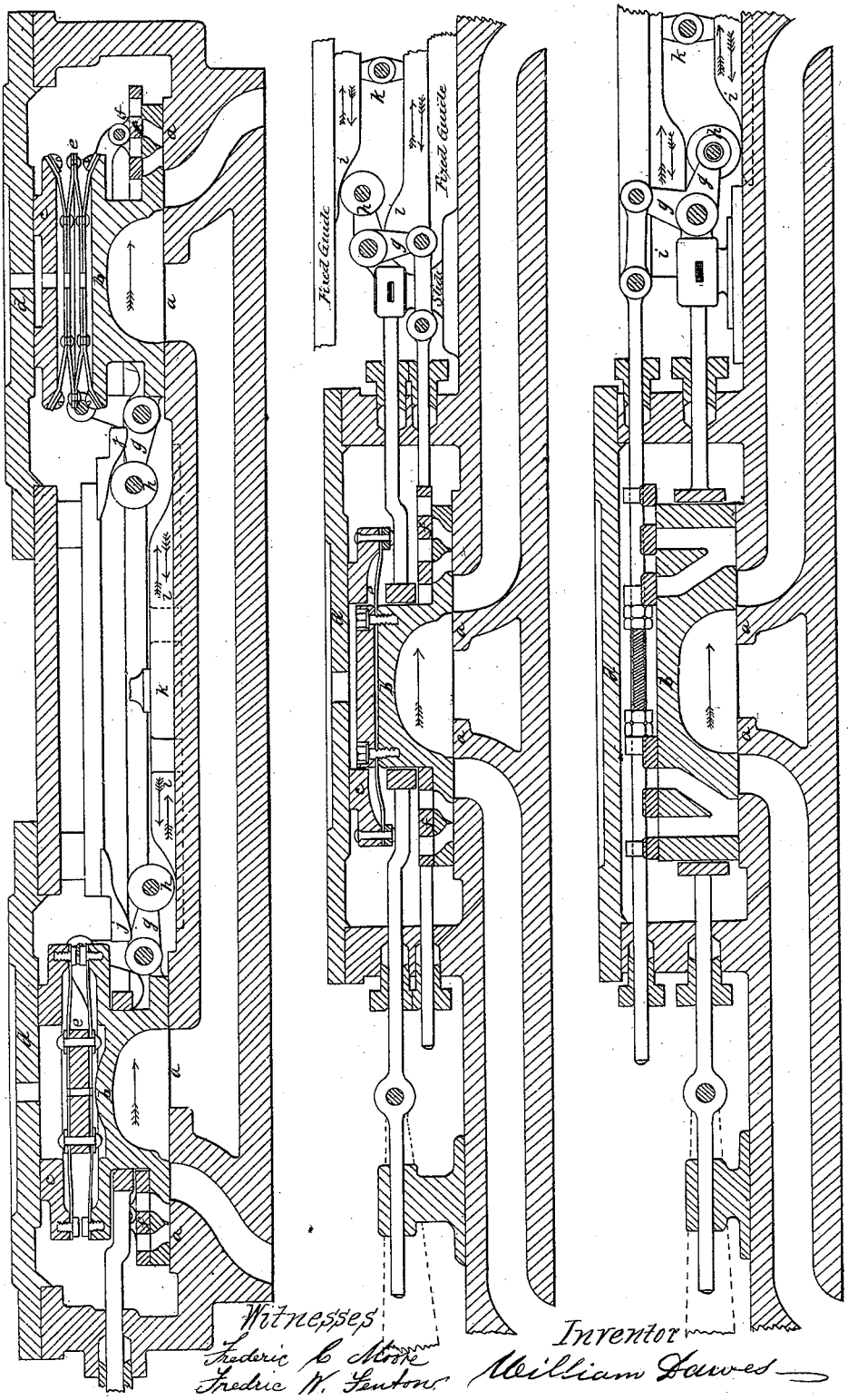

UNITED STATES PATENT OFFICE.

WILLIAM DAWES, OF KINGSTON GROVE, LEEDS, ENGLAND.

IMPROVEMENT IN CUT-OFF-VALVE GEARS.

Specification forming part of Letters Patent No. 96,400, dated November 2, 1869; patented in England, January 5, 1869.

*To all whom it may concern:*

Be it known that I, WILLIAM DAWES, of Kingston Grove, Leeds, in the county of York, England, engineer, a subject of the Queen of Great Britain, have invented or discovered new and useful Improvement in Steam-Engines; and I, the said WILLIAM DAWES, do hereby declare the nature of the said invention, and in what manner the same is to be performed, to be particularly described and ascertained in and by the following statement thereof—that is to say:

My invention consists in a novel and simplified arrangement and construction of variable or governable expansion valve or valves and gear. It may be understood from the following description.

I prefer, for large or costly engines, to use a long steam-chest with a valve and steam and exhaust ports at each end, so as to shorten the steamways and prevent waste of steam. These valves I couple by side rods or otherwise in the usual manner, and they may be worked or actuated by an eccentric or other convenient means.

I prefer, also, to construct them with a suitable elastic metallic steam-tight connection, $e$, between the valve proper, $b$, and traveling plate or frame $c$, as shown in the drawings, or any modification thereof, to insure ease and lightness of working and durability.

I construct upon or through the outer or steam end of each valve a double port, upon which I fit a sliding plate or cut-off valve with ports or openings agreeing or coinciding with the upper faces of the said double ports in the valves, so that a travel or movement of about one-fourth the length of the travel of the main valves given to these cut-off valves shall close or open the said double ports, as required, and hereinafter described. Then, upon the inner or exhaust end of each valve, I fix, by brackets or otherwise, a pair of right-angled or bell-crank levers, the upright arms of which are coupled, by rods passing along the sides of the main valves, to the ends of the before-named cut-off valves or plates; and between the two horizontal arms, or those which stand longitudinally of the valve-chest, I fit a roller, bored and fitted upon a turned pin, which is united or keyed into the ends of these two longitudinal arms of the said bell-crank levers. Then, in or about the center of the steam-chest, between the two valves, I fix a differential movement, of any convenient description, in connection with the governor, so constructed that the rising or falling of the same—*i. e.*, the governor—shall cause two broad wedge-shaped pieces to slide upon the bottom of the valve-chest in contrary directions to each other—that is, as the governor rises they shall both move outward from the center toward the valves, and as the governor falls they shall both move inward from the valves and toward the center—and the position of these wedges with respect to the rollers is such that as the latter travel inward with the valves they shall roll up or upon these broad wedges, and thus, through the bell-cranks and rods, close the cut-off valves alternately, and that earlier or later in the stroke of the piston, according to the position of the governor and the wedges.

The opening of the ports through the cut-off valves, or rather the sliding of the cut-off valves to open the ports each stroke of the piston, I prefer, in this arrangement, to effect by means of two fixed inverted wedge-shaped pieces, attached to the steam-chest over the said rollers, and so placed that when each of the main valves is at the end of its stroke or travel outward one of these fixed wedges and its roller shall have opened the cut-off valve for admitting steam to the piston in the usual manner, and to be closed again as the valve travels inward, by the before-named cut-off action or gear, at the proper part of the stroke of the piston, according to the duty or power required from the engine.

It may be well to explain that the surfaces of the before-named wedges, upon which the rollers work, are not straight, but S-shaped or double curved, so as to secure sweetness and quietness of action, and the further advantages of moving the cut-off valves only the distance required to close and open them, and of opposing the least angle to the roller, and therefore having the greatest power at the beginning and ending of the strokes or travel of the cut-off valves, when, as will be evident, the greatest power is required to move them.

In applying this compensating wedge and roller action or movement to the ordinary single three-port valve, I prefer to use similar separate cut-off plates or valves upon the outer flanges of the main valves, and actuated in a similar manner, the wedges and the bell-cranks and rollers being in the ends of the steam-chest, made longer for that purpose, and I prefer to reverse their relative positions—that is, to place them so that the connecting-rods which couple the bell-cranks to the cut-off valves shall cross each other along the sides of the main valve; or in some cases it may be more convenient to place the said compensating wedge and roller action outside the steam-chest, the connection between it and the valves being obtained by rods through and packing-boxes in the ends of the steam-chest.

It will be evident that the cut-off valves may, in either of the before-described arrangements, be coupled to work together as one, or the cut-off plate or valve may work upon the back of the main valve in the usual manner or position, and the fixed inverted or opening wedges be dispensed with, on account of the closing of the ports for one side of the piston opening those for the other side, as heretofore.

In the accompanying drawings of my invention, $f$ represents the cut-off plate or valve; $g$, the right-angled or bell-crank lever; $h$ the roller; $i$, compensating ogee-wedge; $j$, fixed wedge for opening the cut-off valve; $k$, differential movement for actuating the wedges $i$.

Having thus described and shown the nature of my said invention, and some of the manners or methods in which the same is or may be used or carried into effect, I wish it to be understood that I do not confine or restrict myself to the precise details or arrangements which I have described or referred to, as many modifications and variations may be made therefrom by merely altering details without deviating from the principles, main features, or objects of the said invention; but

What I consider to be novel and original, and therefore claim as the invention secured to me by the hereinbefore in part recited Letters Patent, is—

The governable expansion movement or gear, whereon the traveling cut-off plate or plates or valves are actuated or influenced (worked) by the use of the ogee wedge or wedges and rollers, with the bell-crank or right-angled levers, either inside or outside the steam-chest.

WILLIAM DAWES.

Witnesses:
 JNO. BARBER,
 AUG. MORAND.